United States Patent [19]

Nelson

[11] 4,350,966
[45] Sep. 21, 1982

[54] THERMOSTAT ASSEMBLY

[75] Inventor: Marvin D. Nelson, St. Louis Park, Minn.

[73] Assignee: Honeywell Inc., Minneapolis, Minn.

[21] Appl. No.: 258,333

[22] Filed: Apr. 28, 1981

[51] Int. Cl.³ .................. H01H 37/02; F23N 5/20
[52] U.S. Cl. ........................... 337/302; 236/46 R
[58] Field of Search ............ 236/46 R; 165/12; 337/302–305

[56] References Cited

U.S. PATENT DOCUMENTS 4,013,219 3/1977 Jacobson ................... 337/301 X
4,041,325 8/1977 Angott ...................... 236/46 R X
4,123,739 10/1978 Helms ...................... 236/46 R X Primary Examiner—William E. Wayner
Attorney, Agent, or Firm—Lockwood D. Burton; Mitchell J. Halista

[57] ABSTRACT

An adapter converts a conventional thermostat to effectively approximate a setback thermostat. A conventional thermostat includes a mercury switch which is actuated by a bi-metallic coil. The attachment is interposed between the thermostat and its standard base plate and operates to tilt the entire thermostat under control of the timing mechanism to thereby effectively change the setpoint of the thermostat.

10 Claims, 5 Drawing Figures

THERMOSTAT ASSEMBLY

BACKGROUND OF THE INVENTION

The present invention relates to thermostats. More particularly, it relates to a time controlled setback thermostat.

Traditionally home heating systems have been controlled by thermostats to maintain the temperature in the home at a desired level. More recently, there have been provided time controlled thermostats which are operable to establish a desired temperature in the residence at a predetermined level during certain selected hours and to maintain the residence at a different temperature level during other selected hours. These latter, so called setback thermostats serve two basic purposes, one to establish comfortable temperature level for different conditions, such as cooler at night for sleeping and warmer during the day for active occupancy of the dwelling. The second purpose is that of economy. The provision of means for reducing the temperature of the dwelling during unoccupied hours and/or during sleeping hours provides an economy in the use of fuel and in the cost of heating the dwelling by a significant amount.

Again, traditionally, such setback thermostats comprise a unitary structure having the clock control mechanism and the thermostat all formed as a single unit. In order to obtain the economy of a setback thermostat by one who already has a conventional thermostat in place would require that the conventional thermostat be replaced by a completely new unit featuring the setback thermostat. Not only are the setback thermostats more expensive but they are also expensive to install, usually requiring the services of an expert installer.

In the art, efforts have been made to provide an add-on structure to modify the structure of a conventional thermostat to simulate a setback action of a conventional thermostat. These have included such efforts as providing a time controlled auxiliary heating element which is placed adjacent the standard thermostat to create the impression at the thermostat that the air space in the dwelling is higher than it actually is, thereby forcing a setback action whenever the auxiliary heater is operating. This arrangement is shown in Anderson U.S. Pat. No. 4,035,752.

In other arrangements, a time controlled mechanism is positioned adjacent a conventional thermostat. A mechanical linkage is provided between the time controlled mechanism and the conventional thermostat to effect a changing of the setpoint dial of the thermostat. These have required a modification of the thermostat to accomodate the mechanical linkage, examples of this type of arrangement are shown in U.S. Pat. Nos. to Angott 4,041,325 and to Helms 4,123,739. In both of these devices some modification must be made to the standard thermostat unit itself in order to accomodate the setback attachment. Further, in both of these structures, the adaptation is accomplished by actually changing the setpoint dial in accordance with the setback determined by the time control unit. Such previous efforts at converting a conventional thermostat to a setback thermostat have proved to be either complex, cumbersome, or both.

SUMMARY OF THE INVENTION

It is, accordingly, an object of the present invention to provide an improved adapter for converting a conventional thermostat to a setback thermostat.

It is another object of the present invention to provide an improved adapter as set forth which is relatively simple to install and operate, which is relatively inexpensive, and which does not appreciably change the aesthetic appearance of the standard thermostat.

In accomplishing these and other objects, there has been provided in accordance with the present invention, an adapter for converting a conventional thermostat to effectively approximate a setback thermostat. A conventional thermostat includes a mercury switch which is actuated by a bi-metallic coil. The attachment is interposed between the thermostat and its standard base plate and operates to tilt the entire thermostat under control of the timing mechanism to thereby effectively change the setpoint of the thermostat.

BRIEF DESCRIPTION OF THE DRAWINGS

A better understanding of the present invention may be had from the following detailed description when read in the light of the accompanying drawings, in which.

DETAILED DESCRIPTION

Figure 1:
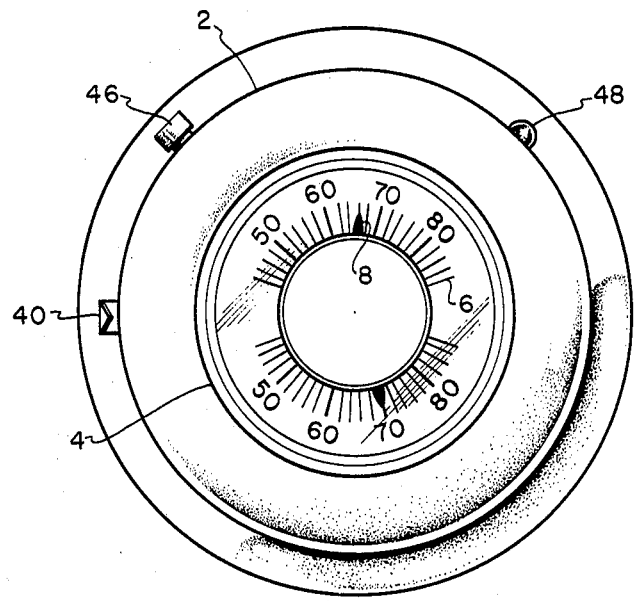
FIG. 1 is a front view of a standard thermostat with an adapter, in accordance with the present invention, in place.

Referring now to the drawings in more detail, there is shown in FIG. 1 a conventional round thermostat which may be of the type shown in U.S. Pat. No. to Kronmiller 2,729,719. In such a conventional thermostat, there is provided a mercury tube switch which is mounted on one end of a spiralled bi-metallic temperature sensitive element. As the temperature in the controlled space increases, the bi-metallic sensitive element changes its relative contour, causing the mercury tube switch to tilt, opening the circuit controlling the application of heat to the controlled environment. When the temperature in the controlled environment is reduced to a predetermined value, the changing dimensions of the bi-metallic element causes the mercury tube to tilt in the opposite direction, reclosing the circuit to the heating means, thereby applying more heat to the controlled environment.

Under standard installation practices, the conventional thermostat body is fixed in position relative to a wall in the structure, the temperature of which is being controlled. Further the thermostat is so oriented relative to a vertical plane that the precalibrated position of the mercury tube switch is in a position which corresponds to the ambient temperature. The thermostat is provided with a rotatable member 4 which is coupled to the bi-metallic element to change the setpoint of the actuation of the switching effect of the mercury tube switch. To enable the operator to selectively adjust the operating point of the thermostat to maintain a predetermined desired temperature, there is a dial or scale 6 which is in a fixed position relative to the body of the thermostat. A pointer 8 is movable with the rotatable member 4 and cooperates with the scale 6, which is calibrated in terms of temperature in degrees, to provide an indicated desired temperature for the operation of the thermostat.

Figure 2:
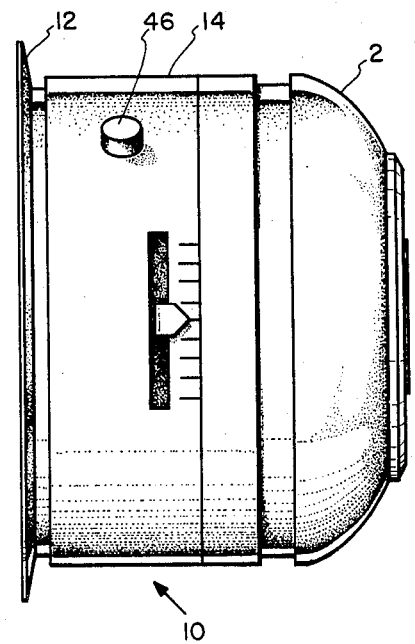
FIG. 2 is a side view of an apparatus as set forth in FIG. 1.
Figure 5:
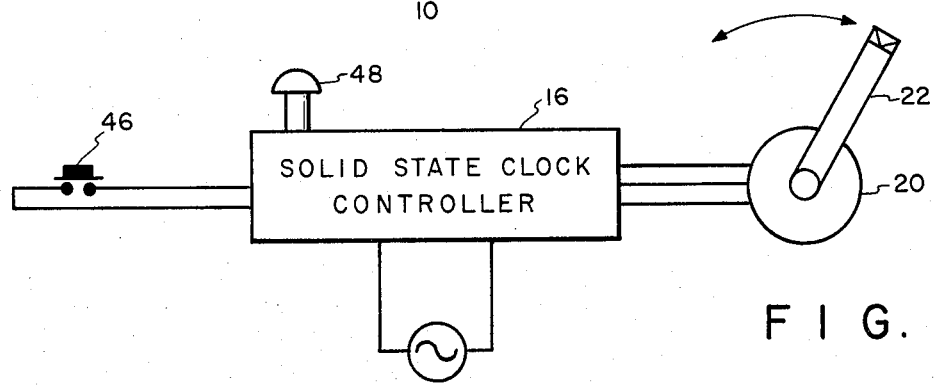
FIG. 5 is a schematic block diagram of circuitry embodying the present invention.
Figure 3:
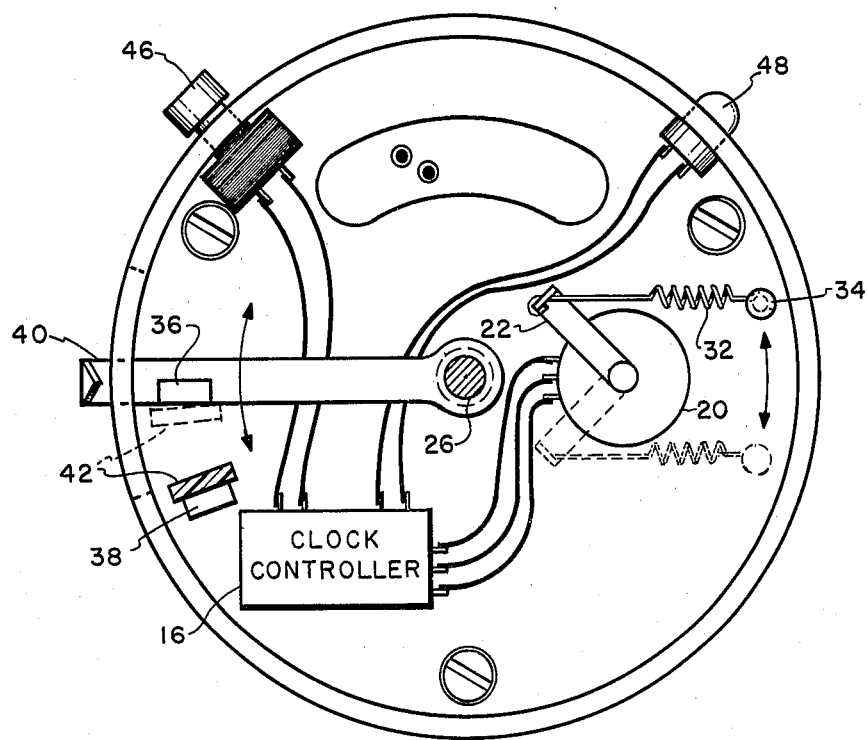
FIG. 3 is a top view, on an enlarged scale of an adapter embodying the present invention.
Figure 4:
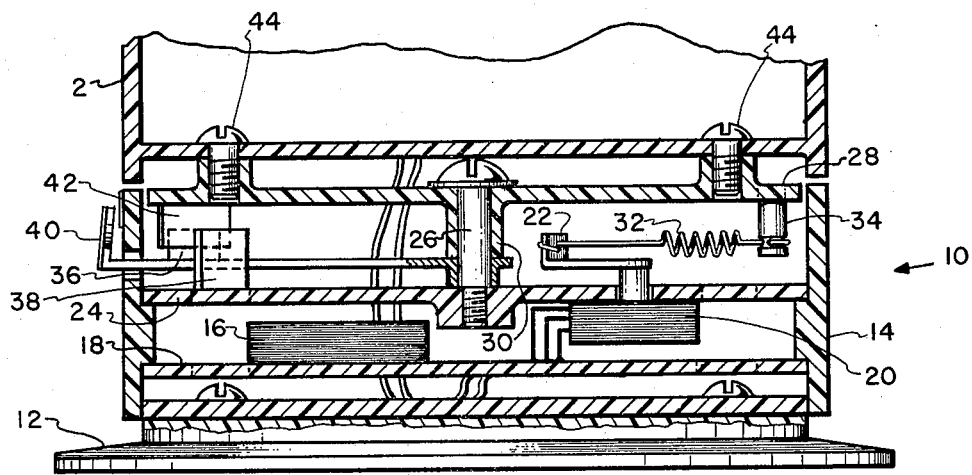
FIG. 4 is a side cross-sectional view of the apparatus shown in FIG. 3.

So long as the thermostat body is fixed in position relative to the aforementioned wall, the effective setpoint for the operation of the thermostat switch is that established by the rotation of the dial 4. In accordance with the present invention however the conventional thermostat is not mounted directly to and in fixed relationship with that wall. As may be more clearly seen in FIG. 2, an adapter 10 is mounted between the mounting base plate 12 and the standard thermostat 2. As will be more clearly seen hereinafter the adapter 10 includes a fixed body portion 14 and a mounting plate which is arranged for limited rotary motion relative to the fixed body portion 14. The standard thermostat 2 is mounted on the movable mounting plate. Within the body portion 14 of the adapter 10 there is a clock mechanism which, preferably, is in the form of a solid state programmable clock controller 16, as most clearly seen in FIGS. 3, 4, and 5. The clock controller 16 is mounted on, preferably, a printed circuit board 18 supported within the body portion 14. The printed circuit board 18 includes connections to a driving member 20. The driving member 20 may be in the form of a two-way rotary solenoid. The solenoid may be energized to operate in one direction or the other as required by the clock controller, as will be seen more clearly hereinafter. A crank or lever 22 is mounted on the shaft of the solenoid 20 for rotation therewith. The solenoid itself is mounted on a fixed mounting plate 24. Centrally of the mounting plate 24, there is a fixed post 26.

A movable mounting plate 28 is mounted for limited rotary motion about the post 26. This may be accomplished by a suitable collar 30 extending from the center of the movable plate 28 and arranged to fit over the upper end of the post 26 and having a suitable keying means to limit the rotation of the plates as well as maintain it securely fastened to the post 26.

A suitable toggle coupling between the arm 22 and the movable plate 28 enables the movable plate 28 to be moved in a limited rotary direction about the post 26 under the control of the driving member 20. In the illustrated embodiment, that toggle arrangement comprises a spring 32 coupled between an upstanding end on the arm 22 and a post 34 fixed to and extending downwardly from the movable plate 28. Thus when the driving member or solenoid 20 has moved the arm to the position shown in solid line in FIG. 3, the movable plate is urged to move a limited amount in the counter-clockwise direction. On the other hand, when the arm 22 has been moved to the position shown in dotted line in FIG. 3 the movable plate will be urged to move in clockwise direction. A first limit stop 36 is adjustable in position and, in the illustrative embodiment is carried by a movable arm 40. A second limit stop 38 is fixed to and extends upwardly from the fixed mounting plate 24. Again in the illustrative embodiment, the movable arm 40 is movable about the center post 26 to move the first limit stop 38 to any selected relatively fixed position. A boss 42 is secured to and depends from the lower surface of the movable plate 28. The boss 42 is positioned to engage the limit stops 36 and 38, respectively, on reciprocal rotary movements under the influence of the driving member 20.

The limit stop 36, being fixed in position, indicates the relatively normal position of the movable plates when the boss 42 is in engagement therewith. The movable limit stop 38 is selectively movable to a position representative of a desired position for the movable plate 28 when the driving member 20 has been actuated to move the plate in that direction.

A standard thermostat 2 is secured to the movable plate 28 as by a plurality of screw members 44.

The solid state clock controller 16 is a state of the art unit and is characterized in that the unit includes a 24-hour clock which may be programmed to a beginning time and an ending time. To accomplish the programming of the clock 16 a pushbutton switch 46 is connected to the programming input of the clock controller 16. An indicator such as a L.E.D. 48, is also connected to the clock controller. At a clock time desired to be the starting time for the operation of this system, the pushbutton 46 is depressed. That actuates an internal programmer within the solid state clock controller 16 which, in turn, causes the L.E.D. 48 to flash at, for example, one second intervals. Each flash of the L.E.D. 48 is representative of one hour of time on the clock controller 16. When the desired number of hours has been indicated by the corresponding number of flashes of the L.E.D. 48, the pushbutton 46 is released. Simultaneously with the operation of the solid state switch in the controller 16, the driver 20, here represented by the solenoid 20, is actuated to the position illustrated in FIG. 3 in solid line. At the end of the programmed number of hours, the clock controller 16 causes the driver 22 to be actuated again to the position shown in dotted line in FIG. 3. When the indicated initial hour has again returned, the clock controller 16 will then cause the driver 20 to be actuated, again, to the position shown in solid line in FIG. 3. The cycling in this manner will continue until such time as the clock controller 16 has been reprogrammed by actuation of the switch 46.

It will be remembered that the conventional thermostat 2 is secured to the movable plate 28. Thus, when the movable plate is shifted from one of its rotary positions to the other, the conventional thermostat 2 is also shifted by the same amount. In the usual arrangement wherein the thermostat 2 is mounted on the base 12, the thermostat body is oriented at a predetermined position relative to the horizontal. Such arrangement is necessary since the operational feature of the conventional thermostat 2 is the inclusion of a mercury tube mounted on a bi-metallic spiral. In normal operation, the pointer 8 is adjusted to a desired room temperature on the scale 6. This in turn adjusts the basic angle of the mercury tube switch on the bi-metallic spiral. As the temperature in the room changes, the angle of the mercury tube switch changes in accordance with the expansion or contraction of the bi-metallic spiral. The resulting closure or opening of the mercury tube switch controls the operation of a heating unit. Thus the actual setpoint value of the thermostat is controlled by the initial angle of the mercury tube switch.

As previously mentioned herein, such thermostats may be adjusted for a different temperature during certain hours, by manually adjusting the knurled movable member 4. In accordance with the present invention, however, the conventional thermostat is made capable of an automatic, time-controlled, setback mode.

The rotational movement of the plates 28, under the influence of the clock controller 16 and the driver member 20, effectively changes the angle of the mercury tube switch within the thermostat by tilting the entire mechanism. This would have the same effect on the thermostat as though the setpoint dial were turned to control the temperature in the room at a lower temperature whenever the movable plate member 28 is rotated under the control of the clock controller to the so called setback position.

The amount of rotation of the movable mounting plate, therefore of the thermostat 2, is limited by the limit stops 36 and 38 in cooperation with the boss 42 carried by the movable mounting plate 28. With the boss 42 in position against the fixed limit stop 38 as shown in solid line in FIG. 3 the thermostat attached to the mounting plate 28 will be in its normal position whereat the pointer 8 on the dial 6 is pointing to the actual desired temperature of the surrounding ambient. When the clock controller 16 has caused the driver 20 to be actuated, the movable plate 28 will be moved to the position shown in dotted line in FIG. 3 with the boss 42 in engagement with the movable limit stop 36. This latter position of the movable plate 28 positions the thermostat thereon such that the ambient temperature in the area controlled by the thermostat will be controlled at a lower temperature during the interval in which the thermostat is tilted to the dotted line position shown in FIG. 3. Effectively, the thermostat 2 has been converted to a time-controlled setback thermostat without the necessity of modifying the structure of the thermostat itself.

Thus there has been provided in accordance with the present invention, an improved adapter for converting a conventional thermostat to a setback thermostat and wherein the adapter is relatively simple to install and operate and which does not appreciably change the aesthetic appearance of the standard thermostat.

The embodiments of the invention in which an exclusive property or privilege is claimed are defined as follows:

1. An adapter for converting a conventional thermostat to a time-controlled setback thermostat, said thermostat including a tilt responsive switch which is tilted in response to temperature changes, said adapter comprising:
    a housing body member,
    means for mounting said body member on a fixed supporting structure;
    a clock-controller means,
    support means for supporting said clock-controller on said body member;
    a driving means mounted on said support means and electrically connected to an output from said clock-controller to be actuated by said clock-controller means between a first and a second position;
    a movable mounting plate supported for limited rotational motion between a first and a second direction on said support means;
    coupling means connected between said driving means and said movable mounting plate for moving said mounting plate whenever said driving means is actuated; and
    means for mounting said conventional thermostat on said movable mounting plate.

2. An adapter as set forth in claim 1 wherein a fixed stop means is provided to limit the movement of said movable mounting plate in said first direction and an adjustable stop means is provided for adjustably limiting the movement of said movable mounting plate in said second direction.

3. An adapter as set forth in claim 2 wherein said adjustable stop means includes means calibrated in temperature degrees whereby the amount of setback of said thermostat may be established in terms of degrees of temperature.

4. An adapter as set forth in claim 3 wherein said clock-controller means comprises a device which is programmable to define a beginning and an end of a measured time interval and to provide a control signal at said beginning and said end of said interval, said driving means being connected to be responsive to said signal.

5. An adapter as set forth in claim 4 wherein said driving means comprises solenoid means.

6. An adapter as set forth in claim 5 wherein said solenoid means is a reversible, double-acting, rotary solenoid.

7. An adapter as set forth in claim 5 wherein said coupling means between said driving means and said movable mounting plate comprises a toggle coupling means.

8. An adapter as set forth in claim 4 wherein programming actuation means is connected to said clock-controller means whereby to selectively establish said beginning and said end of said measured time interval.

9. An adaptor as set forth in claim 8 wherein said programming actuation means includes a display means for displaying the calibration of said clock-controller to establish said measured time interval by indicating time increments programmed into said clock-controller means.

10. An adaptor as set forth in claim 1 wherein said housing body member is substantially coextensive with the periphery of said thermostat.

* * * * *